US009703343B2

(12) United States Patent
Lee

(10) Patent No.: US 9,703,343 B2
(45) Date of Patent: Jul. 11, 2017

(54) TRANSMITTAL SYSTEM AND CONNECTION DEVICE

(71) Applicant: VIA TECHNOLOGIES, INC., New Taipei (TW)

(72) Inventor: Sheng-Yuan Lee, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 264 days.

(21) Appl. No.: 14/046,629

(22) Filed: Oct. 4, 2013

(65) Prior Publication Data

US 2014/0307376 A1    Oct. 16, 2014

Related U.S. Application Data

(60) Provisional application No. 61/811,608, filed on Apr. 12, 2013.

(30) Foreign Application Priority Data

Jul. 31, 2013 (TW) .............................. 102127392 A

(51) Int. Cl.
*G06F 1/26* (2006.01)
*G06F 1/16* (2006.01)

(52) U.S. Cl.
CPC ............ *G06F 1/266* (2013.01); *G06F 1/1632* (2013.01)

(58) Field of Classification Search
CPC ............................... G06F 1/266; G06F 1/1632
USPC .............................. 361/679.08–679.17, 679.4
See application file for complete search history.

(56) References Cited

U.S. PATENT DOCUMENTS

| | | | | |
|---|---|---|---|---|
| 6,650,549 B1* | 11/2003 | Chiao | ................. | H04L 12/4625 343/703 |
| 7,167,372 B2* | 1/2007 | Mori | ..................... | G06F 1/1632 361/731 |
| 7,329,152 B2* | 2/2008 | Mori | ..................... | G06F 3/0227 438/928 |
| 7,899,970 B2* | 3/2011 | Mori | ................... | G06F 13/4022 710/303 |

(Continued)

FOREIGN PATENT DOCUMENTS

| CN | 1417681 | 5/2003 |
|---|---|---|
| CN | 102684270 | 9/2012 |

(Continued)

OTHER PUBLICATIONS

English language translation of abstract of CN 1417681 (published May 14, 2003).

(Continued)

*Primary Examiner* — Adrian S Wilson
(74) *Attorney, Agent, or Firm* — McClure, Qualey & Rodack, LLP

(57) ABSTRACT

A transmittal system including an extension device, a connection device, and an impedance device is disclosed. The extension device includes a first connection port and is coupled to a peripheral device. The connection device includes a second connection port and a third connection port. The second connection port is coupled to the first connection port. The third connection port is coupled to an electronic device. The impedance device connects at least one of the first, the second and the third connection ports to ground.

17 Claims, 3 Drawing Sheets

(56) References Cited

U.S. PATENT DOCUMENTS

| | | | |
|---|---|---|---|
| 8,601,180 B1* | 12/2013 | Chu | G06F 13/4282 710/38 |
| 2005/0070154 A1* | 3/2005 | Milan | 439/502 |
| 2007/0247794 A1* | 10/2007 | Jaffe et al. | 361/681 |
| 2008/0007212 A1* | 1/2008 | Theytaz et al. | 320/107 |
| 2008/0126594 A1* | 5/2008 | Monks et al. | 710/17 |
| 2008/0138028 A1* | 6/2008 | Grady et al. | 386/1 |
| 2010/0067197 A1* | 3/2010 | Guccione | G06F 1/26 361/728 |
| 2010/0100643 A1* | 4/2010 | Shim et al. | 710/1 |
| 2011/0299238 A1* | 12/2011 | Radin | G06F 3/165 361/679.41 |
| 2012/0096207 A1* | 4/2012 | Chen | G06F 13/122 710/303 |
| 2012/0243156 A1* | 9/2012 | Cheng | G06F 13/4022 361/679.02 |
| 2013/0270002 A1* | 10/2013 | Fawcett | 174/84 S |
| 2013/0279110 A1* | 10/2013 | Edwards | E05B 65/461 361/679.44 |
| 2013/0322010 A1* | 12/2013 | Hung | G06F 13/4081 361/679.41 |
| 2014/0299372 A1* | 10/2014 | Meazell | 174/74 R |

FOREIGN PATENT DOCUMENTS

| | | |
|---|---|---|
| CN | 102880238 | 1/2013 |
| TW | 459193 | 10/2001 |
| TW | M394514 | 12/2010 |

OTHER PUBLICATIONS

English language translation of abstract of CN 102684270 (published Sep. 19, 2012).

English language translation of abstract of CN 102880238 (published Jan. 16, 2013).

English language machine translation of TW 459193 (published Oct. 11, 2001).

English language machine translation of TW M394514 (published Dec. 11, 2010).

* cited by examiner

TRANSMITTAL SYSTEM AND CONNECTION DEVICE

CROSS REFERENCE TO RELATED APPLICATIONS

This application claims the benefit of U.S. Provisional Application No. 61/811,608 filed on Apr. 12, 2013, and Taiwan Patent Application No. 102127392, filed on Jul. 31, 2013, the entirety of which are incorporated by reference herein.

BACKGROUND OF THE INVENTION

Field of the Invention

The invention relates to a transmittal system, and more particularly to a transmittal system with a charging function.

Description of the Related Art

With technological advancements, the functions and types of electronic products have increased, wherein mobile devices will be mainstream for electronic products. Generally, a mobile device operates according to its internal battery. However, the functionality of mobile devices has increased, and the power consumption of their batteries has increased accordingly. Mobile devices cannot normally operate when battery power is insufficient and the battery is not charged immediately.

BRIEF SUMMARY OF THE INVENTION

In accordance with an embodiment, a transmittal system comprises an extension device, a connection device and an impedance device. The extension device comprises a first connection port is coupled to a peripheral device. The connection device comprises a second connection port and a third connection port. The second connection port is coupled to the first connection port. The third connection port is coupled to an electronic device. The impedance device connects at least one of the first, second, and third connection ports to ground.

In accordance with another embodiment, a connection device is coupled between an extension device and an electronic device and comprises a first connection port, a second connection port and a transmittal module. The first connection port comprises a plurality of first pins. The second connection port comprises a plurality of second pins. The transmittal module is coupled between the first and second pins. The first pins are coupled to the second pins, respectively. The first connection port is a USB 2.0 Micro-B connector, a USB 2.0 Mini-B connector or a USB 3.0 Micro-B connector. The second connection port is USB 2.0 Micro-B connector, a USB 2.0 Mini-B connector or a USB 3.0 Micro-B connector.

In accordance with a further embodiment, a transmittal system comprises an extension device, an electronic device, a peripheral device and an impedance device. The extension device comprises a first connection port. The electronic device is coupled to the first connection port. The peripheral device is coupled to the extension device. The impedance device connects a pin of the first connection port to ground.

A detailed description is given in the following embodiments with reference to the accompanying drawings.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF THE INVENTION

The making and using of the embodiments of the disclosure are discussed in detail below. It should be appreciated, however, that the embodiments provide many applicable inventive concepts that can be embodied in a wide variety of specific contexts. The specific embodiments discussed are merely illustrative, and do not limit the scope of the disclosure.

Figure 1:
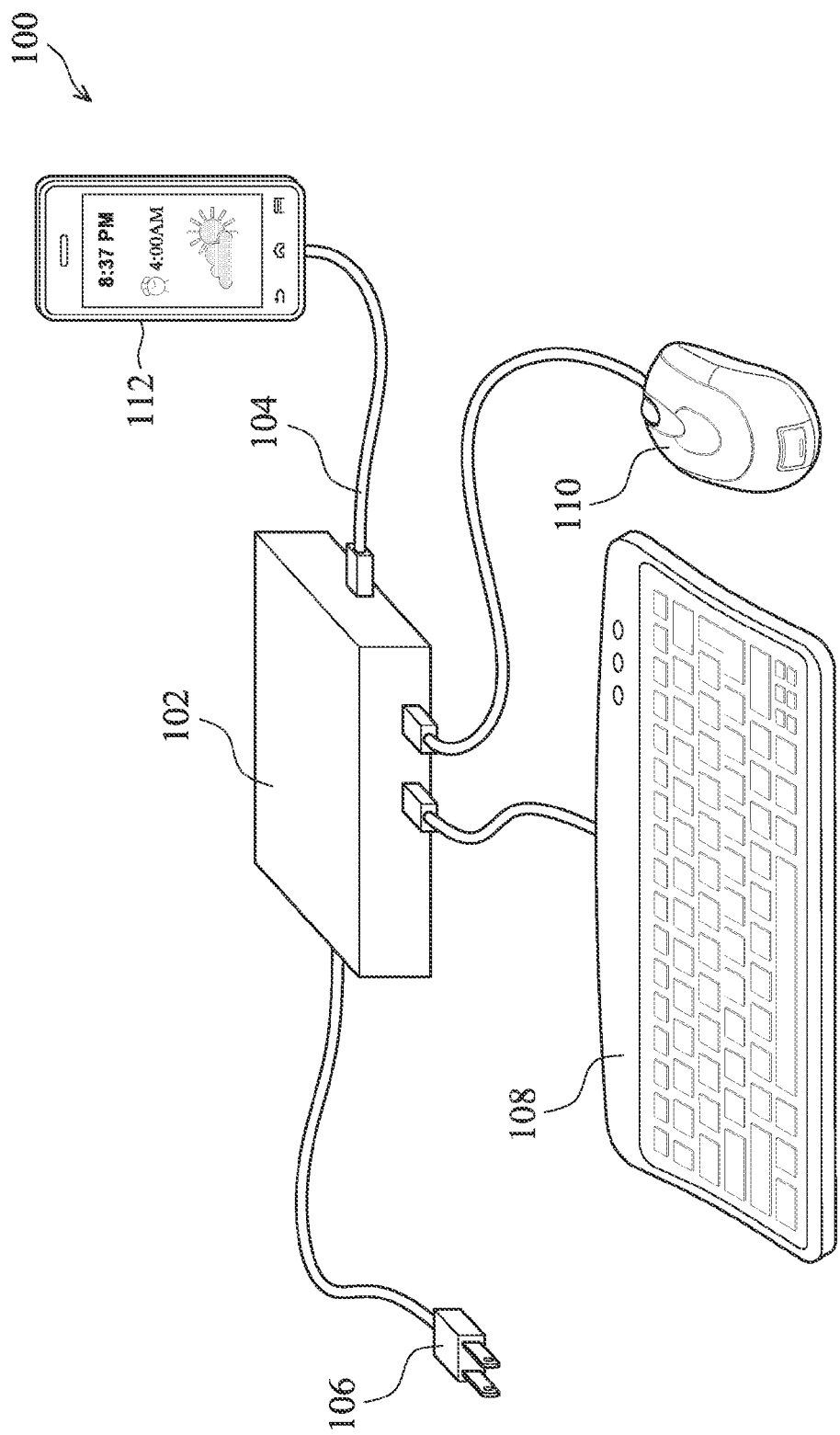
FIGS. 1-3 are schematic diagrams of exemplary embodiments of a transmittal system, in accordance with some embodiments.

FIG. 1 is a schematic diagram of an exemplary embodiment of a transmittal system, in accordance with some embodiments. The transmittal system 100 comprises an extension device 102 and a connection device 104. The extension device 102 is coupled to the connection device 104. In this embodiment, the extension device 102 is capable of receiving external power via a power line 106. In one embodiment, the external power enters the extension device 102 via a transformer (not shown). The disclosure does not limit the kind of external power. In some embodiments, the external power is home power.

A user can utilize the extension device 102 to couple to various peripheral devices, such as a keyboard 108 and a mouse 110, but the disclosure is not limited thereto. The disclosure does not limit the kind of peripheral device. In other embodiments, the extension device 102 is coupled to a printer, a hard disk, a DVD player, and/or a flash disk.

The connection device 104 is coupled between the extension device 102 and the electronic device 112. The disclosure does not limit the kind of connection device 104. Any device can serve as the connection device 104, as long as the device is capable of connecting the extension device 102 to the electronic device 112. In this embodiment, the connection device 104 is a cable with transmittal lines therein. In another embodiment, the connection device 104 is a printed circuit board (PCB) with transmittal lines therein. In some embodiments, the connection device 104 is integrated with the extension device 102. In one embodiment, the connection device 104 is completely integrated with the extension device 102.

The disclosure does not limit the kind of electronic device 112. In this embodiment, the electronic device 112 is a mobile phone. In other embodiments, the electronic device 112 is an electronic device or a mobile electronic device that requires charging, such as a tablet personal computer, a PDA, and so on.

When the electronic device 112 is coupled to the extension device 102 via the connection device 104, the extension device 102 is capable of providing power from the external power to the electronic device 112 for charging. In addition, the extension device 102 is capable of providing power from the external power to the peripheral devices, such as the keyboard 108 and the mouse 110. The electronic device 112 is charged, meanwhile, the extension device 102 transmits signals provided from the peripheral devices to the electronic device 112, or provides signals provided from the electronic device 112 to the peripheral devices, such as a flash disk (not shown).

Additionally, the extension device 102 serves as a hub to increase the number of the connection ports of the host. When a device with a computing function is coupled to the extension device 102, the device with the computing function can serve as a host, such as the electronic device 112.

Here "computing function" means the device comprises at least one of processor, controller, logic circuit, memory and the like therein for operation. Assume that the extension device 102 is a USB hub. Various USB peripheral devices can couple to a host via the USB hub, wherein the USB peripheral devices may be the keyboard 108 and the mouse 110. A user can utilize the peripheral devices to control the host, such as the electronic device 112. On the other hand, when the extension device 102 serves as a USB hub, the host, such as the electronic device 112, may or may not couple to the extension device 102 via the connection device 104.

It is noteworthy that, when the extension device 102 is coupled to various peripheral devices via various connection ports, the connection ports are divided into an upstream port and downstream sports. The upstream port is coupled to a host with a computing function, such as the electronic device 112. The downstream ports are coupled to the peripheral devices, such as the keyboard 108, the mouse 110, the flash disk, and so on. The extension device 102 is capable of providing power to the peripheral device coupled to the downstream ports. It is noteworthy that some conventional extension devices cannot provide power to charge the electronic device coupled to the upstream port although the electronic device has the computing function. In other words, the electronic device coupled to the upstream port is charged by an internal battery, which is configured within the electronic device, or the electronic device coupled to the upstream port is connected to an external power source to receive external power. Therefore, the use of a conventional extension device is not convenient for the user. However, the extension device 102 can provide power to charge the electronic device 112. Therefore, the electronic device 112 coupled to the upstream port can execute the computing function and communicate with the peripheral devices coupled to the downstream ports via the extension device 102 at the same time. At the same time, the extension device 102 can provide power to the electronic device 112 coupled to the upstream port and the peripheral devices coupled to the downstream ports. Therefore, the convenience of the extension device 102 is increased. The extension device 102 is described in more detail herein with respect to the remaining Figures.

Figure 2:
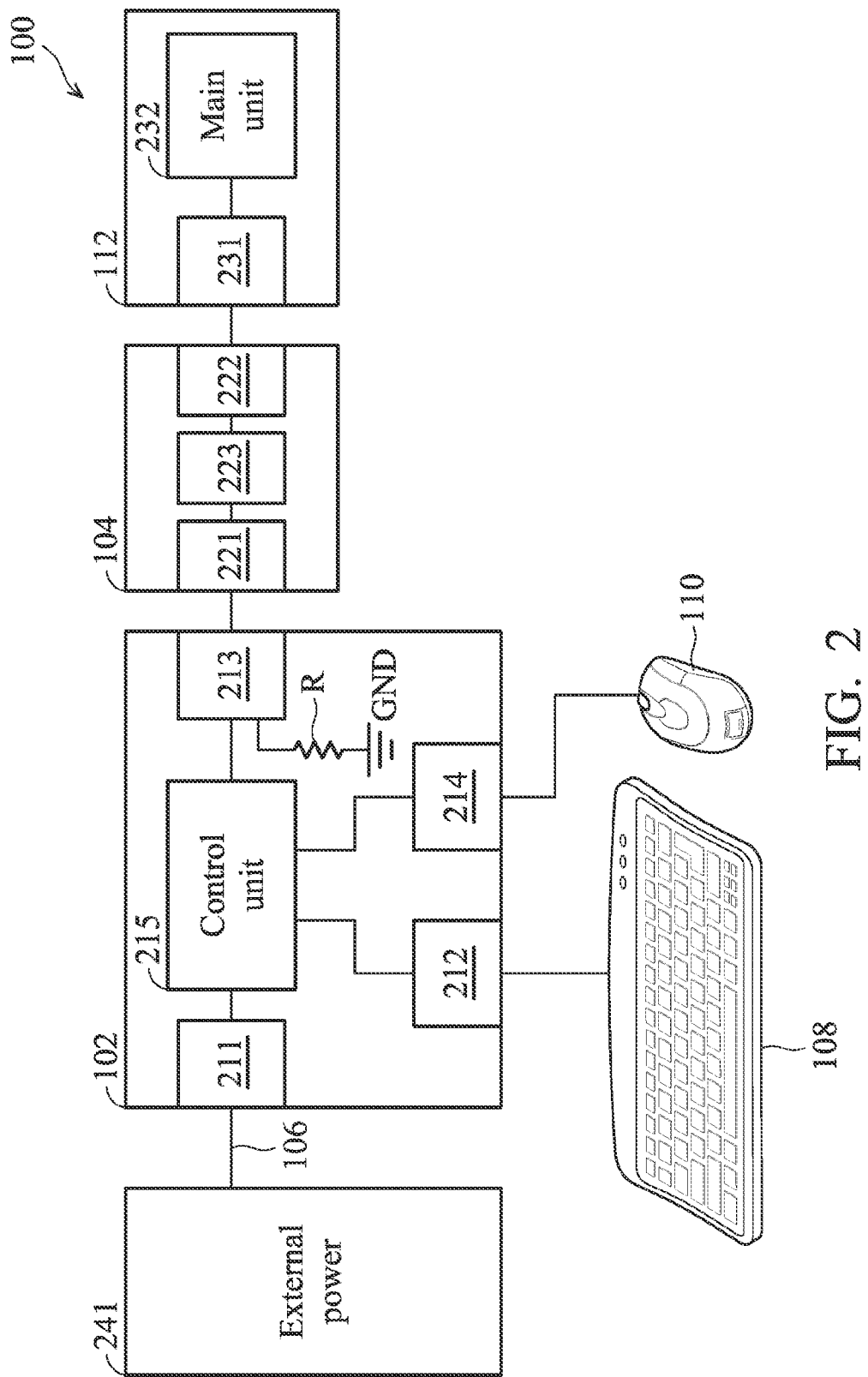

FIG. 2 is a schematic diagram of another exemplary embodiment of a transmittal system, in accordance with some embodiments. The extension device 102 comprises connection ports 211~214 and a control unit 215. The connection port 211 receives external power 241 via the power line 106. The connection ports 212 and 214 are configured to connect peripheral devices, such as the keyboard 108 and the mouse 110. In one embodiment, the connection ports 212 and 214 serve as downstream ports to couple to the peripheral devices. The connection port 213 is configured to be coupled to the connection device 104. In one embodiment, the connection port 213 serves as an upstream port and is coupled to a host with a computing function via the connection device 104.

The disclosure does not limit the kind of connection ports 212~214. The manufacturer manufacturing the extension device 102 configures plug connectors or receptacle connectors within the extension device 102 according to different user requirements. In some embodiments, the connection ports 212~214 are receptacle connectors. In one embodiment, the connection ports 212 and 214 serving the downstream ports may be A-type connectors to couple to the peripheral devices. In another embodiment, the connection port 213 serving the upstream port may be a USB 2.0 Micro-B connector, a USB 2.0 Mini-B connector, or a USB 3.0 Micro-B connector, to couple to the host with a computing function.

The control unit 215 processes information received by the connection ports 211~214 and provides corresponding signals to the connection ports 211~214. For example, when the connection port 211 receives external power 241 and the electronic device 112 is coupled to the connection port 213 via the connection device 104, the control unit 215 transforms the external power 241 and provides the transformed result to charge the electronic device 112 via the connection port 213. In another embodiment, the control unit 215 can transform the external power 241 and provide the transformed result to the electronic device 112 and the peripheral devices, such as the keyboard 108 and the mouse 110, via the connection ports 212~214 at the same time.

The electronic device 112 is charged; meanwhile, the electronic device 112 also communicates with the peripheral devices (e.g. the keyboard 108 and the mouse 110) each other via the control unit 215. In other words, the electronic device 112 can receive information provided from the keyboard 108 and the mouse 110 via the control unit 215. For example, a user utilizes the keyboard 108 and the mouse 110 to control the electronic device 112. In other embodiments, when the connection port 212 or 214 is coupled to a hard disk (not shown), the electronic device 112 reads data stored in the hard disk or writes data onto the hard disk via the control unit 215.

It is noteworthy that when the connection port 213 serving as the upstream port is coupled to a host with a computing function via the connection device 104, the control unit 215 executes a communication between the host and the peripheral devices. At this time, the extension device 102 can serve as a hub. In this embodiment, the extension device 102 is coupled to two peripheral devices via two connection ports (e.g. 212 and 214), but the disclosure is not limited thereto. In other embodiment, the extension device 102 has more connection ports to connect various peripheral devices.

The disclosure is not limited to the circuit structure of the control unit 215. Any circuit can serve as the control unit 125, as long as the circuit can provide communication between the connection ports 211~214 and processing signals between the connection ports 211~214. In one embodiment, the control unit 215 comprises microprocessors, microcontrollers, logic circuits, memory, or other hardware circuit structures. In another embodiment, a memory of the control unit 215 stores a programming code. When one microprocessor or one microcontroller executes the programming code, a transmission of information between the connection ports 211~214 can be achieved.

The connection device 104 comprises connection ports 221, 222 and a transmittal module 223. The connection port 221 is configured to couple to the connection port 213. The connection port 222 is configured to couple to the connection port 231 of the electronic device 112. In one embodiment, the connection port 221 comprises various first pins, and the connection port 222 comprises various second pins. In this embodiment, the transmittal module 223 is coupled between the connection ports 221 and 222 such that the first pins are coupled to the second pins, respectively.

Taking a USB 3.0 connection port as an example, the first and/or second pins at least comprise pins Rx+ and Rx− to receive a differential signal pair, pins Tx+ and Tx− to transmit a differential signal pair, a ground pin, a power pin, pins D+ and D− supporting USB 1.0 or USB 2.0 to transmit/receive a differential signal pair, and an ID pin.

The disclosure does not limit the form of the transmittal module 223. In one embodiment, the transmittal module 223 comprises various transmittal lines to connect the pins of the connection port 221 to the pins of the connection port 222. For example, a first transmittal line of the transmittal module 223 connects a pin of the connection port 221 to a pin of the connection port 222, and a second transmittal line of the transmittal module 223 connects another pin of the connection port 221 to another pin of the connection port 222. In other embodiment, the transmittal module 223 comprises various transmittal lines to connect the pins of the connection port 221 to the pins of the connection port 222. In this case, the connection ports 221 and 222 and the transmittal module 223 are disposed on the same PCB (not shown).

The disclosure does not limit the kind of the connection ports 221 and 222. The manufacturer manufacturing the connection device 104 can provide different connection ports for users. The kind of the connection port 221 may be the same as or different from the kind of the connection port 222. Any connector can serve as the connection port 221 or 222, as long as the connector is capable of corresponding to the connection port 213 or 231. In other words, the connection port 221 matches the connection port 213, and the connection port 222 matches the connection port 231. In one embodiment, the connection port 221 is a USB 2.0 Micro-B connector, a USB 2.0 Mini-B connector or a USB 3.0 Micro-B connector, and the connection port 222 is a USB 2.0 Micro-B connector, a USB 2.0 Mini-B connector or a USB 3.0 Micro-B connector.

In this embodiment, the extension device 102 comprises an impedance device R. The impedance device R is coupled between the connection port 213 and ground GND to connect the connection port 213 to the ground GND. Therefore, the electronic device 112 can identify the extension device 102 as a charging device and provide charging power to the electronic device 112 coupled to the connection port 213 served as an upstream port.

It is noted that when the connection port 213 is a USB 2.0 Micro-B connector, a USB 2.0 Mini-B connector or a USB 3.0 Micro-B connector, since the Micro-B or Mini-B connector comprises an ID pin, the ID pin of the connection port 213 can couple to the ID pin of the electronic device 112 via the connection device 104 and couple to the ground GND via the impedance device R. Therefore, the electronic device 112 can identify the extension device 102 as a charging device.

The disclosure does not limit the position of the impedance device R. Any position can dispose the impedance device R, as long as the position is capable of connecting the ID pin to the ground GND. In this embodiment, the impedance device R is integrated in the extension device 102. In other embodiments, the impedance device R is integrated in the connection device 104 to connect a pin (e.g. the ID pin) of the connection port 221 or 222 to the ground GND.

In other embodiments, the connection device 104 may be a cable or a PCB. The cable has two connection ports 221 and 222. For example, if the connection device 104 is a PCB, the transmittal module 223 comprises various transmittal lines to provide communication between the connection ports 221 and 222. The transmittal lines and the connection ports 221 and 222 are disposed on the PCB. In other embodiments, the connection device 104 is completely or incompletely integrated in the extension device 102. The connection device 104 integrated in the extension device 102 is described in greater detail in FIG. 3.

Refer to FIG. 2 again, the electronic device 112 comprises a connection port 231 and a main unit 232. The main unit 232 has a computing function. The disclosure does not limit the kind of connection port 231. In one embodiment, the connection port 231 is a USB 2.0 Micro-B connector, a USB 2.0 Mini-B connector or a USB 3.0 Micro-B connector. The kind of connection port 231 may match the connection port 222 of the connection device 104. When the electronic device 112 is coupled to the extension device 102 via the connection device 104, the main unit 232 determines the level of the ID pin of the connection port 231. When the ID pin of the connection port 231 is connected to the ground GND via the impedance device R, the main unit 232 identifies the extension device 102 as a charging device. The electronic device 112 receives charging power provided from the extension device 102.

It is noteworthy that when the electronic device 112 is a mobile electronic device, most the connection port 231 of the mobile electronic device may be a Micro-B or Mini-B connector. Assume that the connection port 213 is also a Micro-B or Mini-B connection: the electronic device 112 is coupled to the extension device 102 via the connection device 104 with two Micro-B or Mini-B connectors. Since the impedance device R connects the ID pin of the connection port 213 to the ground GND, the electronic device 112 can be charged. Furthermore, when the extension device 102 serves as a hub and is coupled to a peripheral device, the electronic device 112 can communicate with the peripheral device via the extension device 102.

The disclosure does not limit the circuit structure of the main unit 232. In one embodiment, the main unit 232 comprises various processors, controllers, logic circuits, memories, and the like. In this embodiment, the circuit structure of the main unit 232 relates to the kind of electronic device 112. Any circuit can serve as the main unit 232, as long as the circuit is capable of accomplishing the functions of the electronic device 112.

Since the extension device 102 has a charging function and can serve as a hub, the convenience of the extension device 102 is increased. Furthermore, the connection ports 213, 221, 222 and 231 are common and popular ports such that a user can easily connect the electronic device 112 to the extension device 102 to charge the electronic device 112. Therefore, a user does not need to buy a specific connection device to charge the electronic device 112 and the convenience of the charging is increased.

Figure 3:
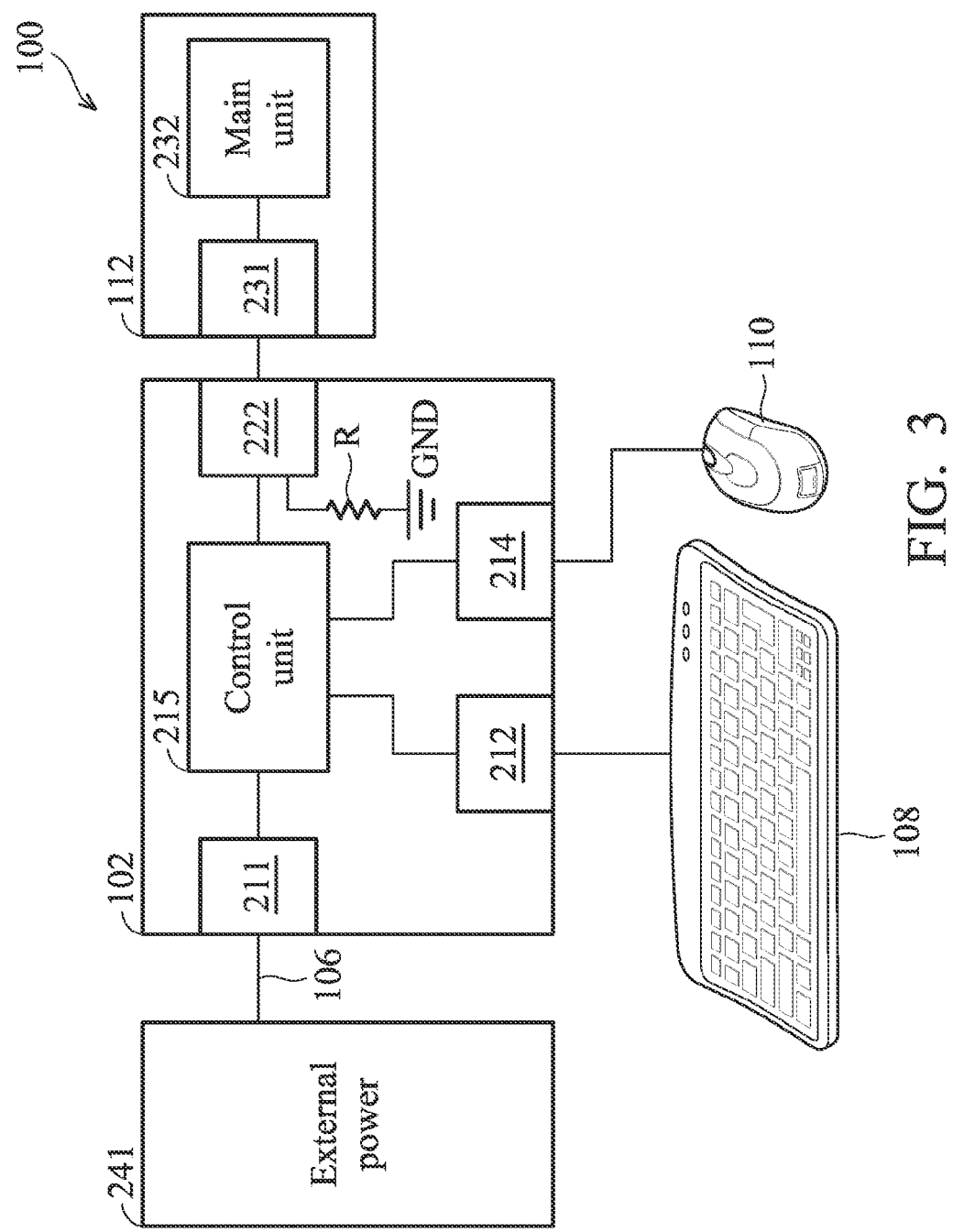

FIG. 3 is a schematic diagram of another exemplary embodiment of a transmittal system, in accordance with some embodiments. FIG. 3 is similar to FIG. 2 with the exception that the connection device 104 is integrated into the extension device 102. In this embodiment, the connection port 213 is replaced with the connection port 222. Therefore, the extension device 102 can directly couple to the electronic device 112, and the electronic device 112 does not utilize the connection device 104 to connect to the extension device 102. Thus the cost of elements can be reduced. Since the operations of elements in FIG. 3 are the same as the operations of elements in FIG. 2, the descriptions of elements in FIG. 3 are omitted for brevity.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transmittal system, comprising:
an extension device comprising a first connection port and a second connection port coupled to a peripheral device;
a connection device comprising a third connection port and a fourth connection port, wherein the third connection port is coupled to the first connection port, and the fourth connection port is coupled to an electronic device; and
an impedance device connecting at least one of the first, the third and the fourth connection ports to ground, wherein the peripheral device is capable of controlling the electronic device, wherein the extension device transmits signals between the peripheral device and the electronic device such that the peripheral device is capable of controlling the computing function of the electronic device,
wherein each of the first connection port, the third connection port and the fourth connection port comprises a USB connector port with a corresponding identification (ID) pin,
wherein the extension device is configured to serve as a hub to transmit data from the electronic device to the peripheral device and transmit data from the peripheral device to the electronic device, and
wherein the impedance device comprises an internal resistor that connects the ID pin of the first connection port to the ground within the extension device for identifying that the electronic device is capable of being charged.

2. The transmittal system as claimed in claim 1, wherein the electronic device is a host with a computing function.

3. The transmittal system as claimed in claim 1, wherein the third connection port is a USB 2.0 Micro-B connector, a USB 2.0 Mini-B connector or a USB 3.0 Micro-B connector, and the fourth connection port is a USB 2.0 Micro-B connector, a USB 2.0 Mini-B connector or a USB 3.0 Micro-B connector.

4. The transmittal system as claimed in claim 1, wherein the connection device is a connection cable or a printed circuit board (PCB).

5. The transmittal system as claimed in claim 1, wherein the connection device is integrated into the extension device.

6. The transmittal system as claimed in claim 1, wherein the impedance device is integrated into the extension device or the connection device.

7. The transmittal system as claimed in claim 1, wherein the first connection port is a USB 2.0 Micro-B connector, a USB 2.0 Mini-B connector or a USB 3.0 Micro-B connector.

8. The transmittal system as claimed in claim 1, wherein the extension device further comprises a fifth connection port, and when external power is received by the fifth connection port, the first connection port is coupled to the third connection port and the fourth connection port is coupled to the electronic device, the external power is provided to the electronic device and the peripheral device.

9. The transmittal system as claimed in claim 1, wherein the extension device is a hub, and when the second connection port is coupled to the peripheral device, the electronic device communicates information with the peripheral device each other.

10. The transmittal system as claimed in claim 1, wherein the electronic device comprises a sixth connection port, the fourth connection port is configured to couple to the sixth connection port, and the sixth connection port is a USB 2.0 Micro-B connector, a USB 2.0 Mini-B connector or a USB 3.0 Micro-B connector.

11. A transmittal system comprising:
an extension device comprising a first connection port;
an electronic device coupled to the first connection port;
a peripheral device coupled to the extension device, wherein the peripheral device is capable of controlling the electronic device, wherein the extension device transmits signals between the peripheral device and the electronic device such that the peripheral device is capable of controlling the computing function of the electronic device; and
an impedance device comprising a resistor internal to the extension device for connecting an ID pin of the first connection port to ground within the extension device for identifying that the electronic device is capable of being charged, wherein the extension device is configured to serve as a hub to transmit data from the electronic device to the peripheral device and transmit data from the peripheral device to the electronic device.

12. The transmittal system as claimed in claim 11, wherein the electronic device is a host with a computing function.

13. The transmittal system as claimed in claim 11, wherein the first connection port is USB 2.0 Micro-B connector, a USB 2.0 Mini-B connector or a USB 3.0 Micro-B connector.

14. The transmittal system as claimed in claim 11, wherein the extension device further comprises a second connection port, and when the second connection port receives external power and the first connection port is coupled to the electronic device, the external power is provided to the electronic device and the peripheral device, wherein the external power is provided to the electronic device when the ID pin of the first connection port is coupled to ground.

15. The transmittal system as claimed in claim 14, wherein the extension device further comprises a third connection port, the extension device is a hub, and when the third connection port is coupled to the peripheral device, the electronic device communicates information with the peripheral device each other.

16. The transmittal system as claimed in claim 14, wherein the electronic device comprises a fourth connection port, the fourth connection port is configured to be coupled to the first connection port, and the fourth connection port is USB 2.0 Micro-B connector, a USB 2.0 Mini-B connector or a USB 3.0 Micro-B connector, and the fourth connection port comprises an ID pin.

17. The transmittal system as claimed in claim 1, wherein the first connection port is a USB connector with an identification (ID) pin, and the impedance device connects the identification pin to the ground.

* * * * *